United States Patent [19]
Ilvashenko

[11] Patent Number: 6,086,999
[45] Date of Patent: *Jul. 11, 2000

[54] METHOD FOR PRODUCING A GRADED INDEX PLASTIC OPTICAL MATERIAL

[75] Inventor: Victor M. Ilvashenko, Shrewsbury, Mass.

[73] Assignee: Boston Optical Fiber, Inc., Westborough, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/873,952

[22] Filed: Jun. 12, 1997

[51] Int. Cl.⁷ ..................................................... D02G 3/00
[52] U.S. Cl. ............................ 428/375; 428/374; 385/124
[58] Field of Search ..................... 264/1.6, 1.24, 264/1.7, 1.1, 1.29, 1.38, 2.6, 2.7; 428/374, 375; 525/265, 277, 306, 932, 268; 385/124, 141; 351/159, 16, 177; 524/285, 287, 315, 317

[56] References Cited

U.S. PATENT DOCUMENTS

| | | | |
|---|---|---|---|
| 3,718,383 | 2/1973 | Moore | 350/175 |
| 3,816,160 | 6/1974 | Moore | 117/33.3 |
| 3,955,015 | 5/1976 | Ohtsuka et al. | 427/163 |
| 4,022,855 | 5/1977 | Hamblen . | |
| 4,587,065 | 5/1986 | Kouichi et al. . | |
| 4,689,000 | 8/1987 | Kouichi et al. . | |
| 4,966,435 | 10/1990 | Matsumoto et al. | 350/96.34 |
| 5,076,659 | 12/1991 | Bekiarian et al. | 385/143 |
| 5,175,786 | 12/1992 | Toyoda et al. . | |
| 5,235,660 | 8/1993 | Perry et al. | 385/124 |
| 5,253,323 | 10/1993 | Koike et al. . | |
| 5,258,144 | 11/1993 | Yean et al. . | |
| 5,262,896 | 11/1993 | Blankenbecler . | |
| 5,382,448 | 1/1995 | Koike et al. | 427/163.2 |
| 5,541,247 | 7/1996 | Koike | 524/285 |
| 5,555,525 | 9/1996 | Ho et al. . | |
| 5,593,621 | 1/1997 | Koike et al. | 264/1.29 |
| 5,729,645 | 3/1998 | Garito et al. . | |
| 5,760,139 | 6/1998 | Koike et al. . | |
| 5,763,514 | 6/1998 | Koike . | |
| 5,767,200 | 6/1998 | Koike . | |
| 5,783,636 | 7/1998 | Koike et al. . | |
| 5,851,666 | 12/1998 | Nonaka et al. . | |
| 5,891,570 | 4/1999 | Nonaka et al. . | |
| 5,911,025 | 6/1999 | Garito et al. . | |
| 5,916,495 | 6/1999 | Nonaka et al. | 264/1.24 |

FOREIGN PATENT DOCUMENTS

| | | |
|---|---|---|
| 2188215 A1 | 4/1997 | Canada . |
| 0 472 384 A3 | 2/1992 | European Pat. Off. . |
| 0 606 598 A2 | 7/1994 | European Pat. Off. . |
| 0 615 141 A1 | 9/1994 | European Pat. Off. . |
| 0 710 855 A1 | 5/1996 | European Pat. Off. . |
| 0 752 598 A1 | 1/1997 | European Pat. Off. . |
| 0 911 657 A1 | 4/1999 | European Pat. Off. . |
| 8-114714 | 5/1996 | Japan ............... G02B 6/00 |
| WO 97/10285 | 3/1997 | WIPO . |
| WO 98/07057 | 2/1998 | WIPO . |

OTHER PUBLICATIONS

Y. Koike, "High–Bandwidth Graded–Index Polymer Optical Fiber", Journal of Lightwave Technology, vol. 13, No. 7, pp. 1475–1489, Jul. 1995.

T. Ishigure et al., "High bandwidth and high numerical aperture graded–index polymer optical fibre", Electronics Letters, vol. 30, No. 14, pp. 1169–1171, Jul. 1994.

Nihei, E., et al., "Present Prospect of Graded–Index Plastic Optical Fiber in Telecommunication," *IEICE Trans. Electron.*, E80–C(1):117–122 (1997).

*Primary Examiner*—Bruce H. Hess
*Assistant Examiner*—Chris Cronin
*Attorney, Agent, or Firm*—Wolf, Greenfield & Sacks, P.C.

[57] ABSTRACT

Graded index plastic optical materials, including preforms and fibers produced therefrom, are described. Methods for producing the optical materials using dopants in the sheathing of the material are also described. The graded index plastic optical materials have excellent optical characteristics, enhanced flexibility and good environmental stability.

14 Claims, 2 Drawing Sheets

METHOD FOR PRODUCING A GRADED INDEX PLASTIC OPTICAL MATERIAL

GOVERNMENT FUNDING

The invention described herein was made in whole or in part with government support under a contract issued by the Defense Advanced Research Projects Agency (DARPA) in response to DARPA solicitation #BAA96-29 and under contract number DAA20L-94-C-3425 with the Advanced Research Projects Agency (ARPA). The United States Government may have certain rights in the invention.

BACKGROUND OF THE INVENTION

Optical resin materials which are characterized by a distributed refractive index have demonstrated usefulness in the construction of optical conductors such as, optical fibers, optical waveguides, and optical integrated circuits as well as the corresponding preforms of these conductors. In general, plastic optical fibers (POF) are considered an attractive alternative to copper cable and glass optical fibers. Typically, the plastic optical fiber (or thin, flexible rod) has a core within which light travels and a sheathing layer which surrounds the core, confines the light to the core and possesses an index of refraction less than that of the core.

The refractive index distribution of plastic optical fibers can be classified as either gradient index or step index. However, graded index plastic optical fibers (GI POF) are preferred over step index fibers for data communication applications. That is, the index of refraction, in a graded index plastic optical fiber, generally decreases radially from the core center outward until it matches the sheathing index at the core-sheathing interface. Therefore, light rays entering the core at a small angle, with respect to the axis, follow undulating paths, which is not the case for a step index type fiber. The speed of the light rays along the undulating paths increases in the regions of lower refractive index so that the travel time along these paths is nearly equal to that along the straight axial path. This results in, for example, a wider bandwidth of transmission with minimal modal dispersion and a more rapid information flow than that obtained with step index plastic optical fibers.

In general, methods of fabricating graded index plastic optical materials comprise preparation of a polymeric sheathing and a polymeric core disposed within the sheathing. The refractive index of the core and sheathing are different in that the refractive index of the core is greater than that of the sheathing. Frequently, the core is the same polymer as that which comprises the sheathing but, in addition includes a non-polymeric substance (commonly referred to as a dopant) which causes the refractive index of the core to be greater than that of the sheathing. See for example, U.S. Pat. No. 5,541,247 to Koike.

However, currently available methods of fabrication have significant shortcomings. For example, the type and amount of substances which can be incorporated into the core and still provide a graded index plastic optical material which maintains both transparency and an acceptable difference in the refractive index between the sheathing and the core, are limited. Therefore, a need exists for methods and materials useful for fabricating graded index plastic optical materials.

SUMMARY OF THE INVENTION

The present invention is based upon the discovery that, surprisingly, a graded index plastic optical material having excellent optical characteristics can be achieved using a method of manufacturing, which incorporates a low refractive index dopant (i.e., lower than the polymer of the sheathing) in the sheathing of the material.

The present invention thus relates to a graded index plastic optical material, and methods of processing the material. The method of the invention provides for the use of a significantly broader selection of materials which consequently provides a graded index plastic optical fiber with excellent optical characteristics. For example, the method of the invention allows control of the graded refractive index of the material and thereby produces a graded index plastic optical material with a low loss and broad transmission bandwidth, having a high level of transparency, a substantial absence of bubbles and good environmental stability, for example, enhanced thermal stability and resistance to humidity.

A method for forming a graded index plastic optical material comprises the steps of: (a) providing a transparent tube of sheathing material comprising a sheathing polymer and a sheathing dopant; and (b) forming a transparent core within the sheathing tube produced in step (a) by: (i) filling the interior space of the sheathing tube, with a core solution comprising a core polymerizable monomer which upon polymerization has a refractive index greater than that of the sheathing tube; and (ii) allowing the core polymerizable monomer to polymerize thereby forming a polymer having a refractive index greater than that of the sheathing tube such that the material is suitable to conduct light. The core solution can comprise an optional core dopant. When present, the core dopant will have a refractive index greater than that of the polymer obtained upon polymerization of the core monomer. The product thus obtained, is a graded index plastic optical material having an outer transparent sheathing and an inner transparent core. The refractive index of the core is greater than that of the sheathing such that the material is suitable to conduct light, with the refractive index of the core gradually decreasing in a radial direction from the center of the core to the periphery. In general, the material is in the shape of a preform rod. Preferably, the preform rod has a cylindrical shape which can be drawn into fibers.

In a preferred embodiment, the sheathing tube is made by extrusion methods. Alternatively, the sheathing tube can be produced by: (a) placing into a polymerization container a sheathing solution comprising a sheathing polymerizable monomer and a sheathing dopant, the sheathing dopant having a refractive index lower than that of the polymer obtained by the polymerization of the sheathing monomer; and (b) causing the sheathing monomer of the sheathing solution to polymerize within the polymerization container in a cylindrical configuration to form a transparent sheathing tube.

The invention further provides a method for forming a graded index plastic optical fiber. The graded index plastic optical material is prepared, for example, as described above, in the shape of a preform rod which can then be subjected to hot-drawing at a temperature and speed suitable to render the fiber useful as an optical conductor.

In a certain embodiment, the monomer of the sheathing solution and the monomer of the core solution are the same. Suitable monomers include those which form polymers that are substantially amorphous and capable of conducting light in the desired wavelength. In this embodiment, when a core dopant is used it will be different from the sheathing dopant.

The graded index plastic optical material of the invention comprises (a) a transparent sheathing comprising a sheathing polymer and a sheathing dopant, wherein the sheathing dopant has a refractive index which is less than that of the sheathing polymer; and (b) a transparent core, disposed within the sheathing, comprising a core polymer having a refractive index greater than that of the sheathing and an optional core dopant, the core dopant, when present, having a refractive index which is greater than that of the core polymer; wherein the core dopant has a concentration gradient in a specific direction. The refractive index of the core is greater than that of the doped sheathing.

In a preferred embodiment, the material is in the shape of a cylindrical preform rod. In another application the material is in the shape of a cylindrical fiber having an outer diameter between about 0.2 millimeters and about 1 millimeter.

DETAILED DESCRIPTION OF THE INVENTION

The features and other details of the invention will now be more particularly described and pointed out below as well as in the claims. It will be understood that the particular embodiments of the invention are shown by way of illustration and not as limitations of the invention. The principle features of this invention can be employed in various embodiments without departing from the scope of the invention.

In one aspect, the invention provides a method for forming a graded index plastic optical material comprising the steps of: (a) forming a transparent tube of sheathing material by: (i) placing into a polymerization container a sheathing solution comprising a sheathing polymerizable monomer and a sheathing dopant, wherein the sheathing dopant has a refractive index lower than that of the polymer obtained by the polymerization of the sheathing monomer; and (ii) causing the sheathing monomer of the sheathing solution to polymerize within the polymerization container to give an inner cylindrical configuration in the form of a transparent sheathing tube; and (b) forming a transparent core within the sheathing tube produced in step (a) by: (i) filling the interior space of the sheathing tube with a core solution comprising a core polymerizable monomer which upon polymerization has a refractive index greater than that of the sheathing tube; and (ii) allowing the core polymerizable monomer to polymerize thereby forming a polymer having a refractive index greater than that of the sheathing tube such that the material is suitable to conduct light. The core solution can comprise an optional core dopant. When present, the core dopant will have a refractive index greater than that of the polymer obtained upon polymerization of the core monomer.

Figure 1:
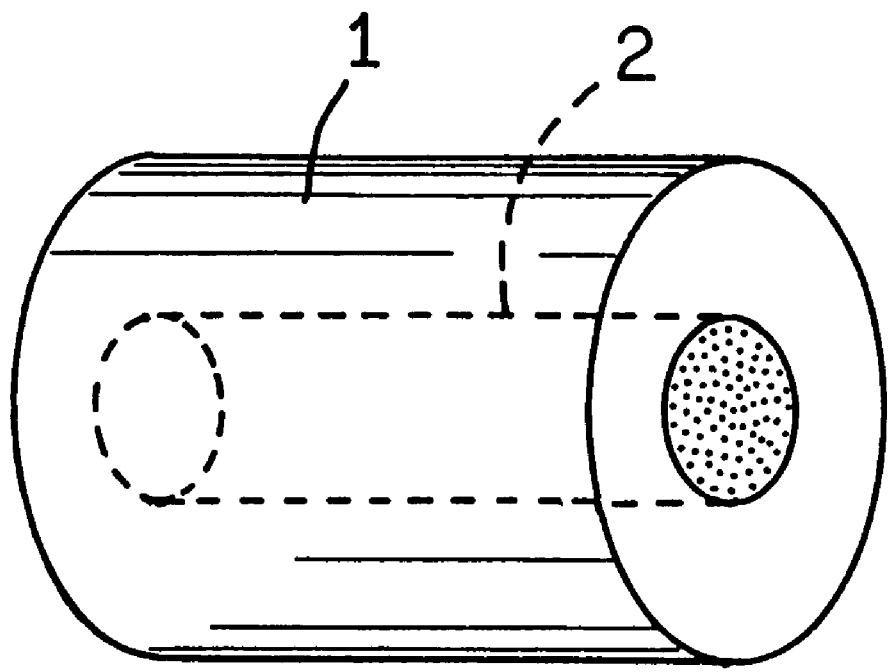
FIG. 1 depicts a preferred embodiment of a graded index plastic optical material producible by the process of the invention.

The product thus obtained, is a graded index plastic optical material having an outer transparent sheathing layer and an inner transparent core. The refractive index of the core is greater than that of the sheathing such that the material is suitable to conduct light, with the refractive index of the core gradually decreasing in a radial direction from the center of the core to the periphery. In general, the material is in the shape of a preform rod, as shown in FIG. 1, where the transparent sheathing is depicted as component 1 and the core is depicted as component 2. Preferably, the preform rod has a cylindrical shape.

The method also provides for forming a graded index plastic optical fiber. This comprises formation of a graded index plastic optical material, for example, as described above, in the shape of a preform rod followed by hot-drawing of the preform at a temperature and speed suitable to render the fiber useful as an optical conductor.

The term "preform rod" as used herein is the rod shaped form of the graded index plastic optical material that can be produced according to the method of the present invention. In general, the rod can be further processed into an optical conductor such as an optical fiber, an optical waveguide or an optical integrated circuit. For example, after the preform rod is produced, it can be removed from the polymerization container and formed into a plastic optical fiber. This can be accomplished, for example, by hot-drawing of the preform. Other known fiber producing techniques, for example, extrusion can also be employed.

The polymerization container used in the method of the invention can be composed of any material which is inert to the sheathing solution, for example, glass. The container shape and dimensions will determine the outer shape of the graded index plastic optical material ultimately obtained in the practice of the method. A sheathing tube is produced, using the well known technique of rotation casting, by placing a sheathing solution in the polymerization container and causing the solution to polymerize within the container to give an inner cylindrical configuration. Thus, the polymerization container can be any shape which when rotated about its own axis creates a sheathing tube with an inner cylindrical configuration. The preferred shape of the container is cylindrical, preferably with dimensions that can achieve a preform rod suitable for hot-drawing into an optical fiber.

The sheathing of the graded index optical material is the outer layer of the material. The sheathing is prepared using the well known technique of rotation casting, by placing into a polymerization container a sheathing solution comprising a sheathing polymerizable monomer and a sheathing dopant and causing the sheathing polymerizable monomer of the sheathing solution to polymerize within the container in a cylindrical configuration. The sheathing dopant does not participate in the polymerization reaction. Polymerization of the monomer into a cylindrical configuration can be accomplished by, for example, rotating the polymerization container about its own axis, during polymerization. The centrifugal force resulting from the rotation will cause the resulting polymer to form a tube of sheathing material or a sheathing tube within the polymerization container. Rotation can be accomplished, for example, by spinning the container.

Alternatively, the sheathing can also be prepared by extrusion of the doped sheathing polymer into tubular shapes using extrusion methods which are well known to those of skill in the art. The outer and inner shape of the sheathing in this method will be dictated by the shape of the extrusion dye. The extruded sheathing will then serve as the container into which the core solution will be added and allowed to polymerize.

The amount of sheathing solution placed in the polymerization container can be determined based upon the ratio of the thickness of the sheathing wall to the distance between the opposing interior walls of the sheathing, which is desired. This ratio will depend upon the cost of materials and the end use of the optical material.

The polymerizable sheathing monomer can be any monomer which upon polymerization yields substantially amorphous and transparent polymeric materials. Preferably, the polymeric materials of the sheathing are at least partially soluble in the monomer present in the core solution and exhibit a suitable miscibility with the sheathing dopant.

Polymerizable monomers suitable for use in this invention include, but are not limited to, for example, methacrylate monomers such as branched and unbranched $C_1$–$C_{10}$ alkyl methacrylates, for example, methyl methacrylate, ethyl methacrylate, n-propyl methacrylate, n-butyl methacrylate, n-hexyl methacrylate, isopropyl methacrylate, isobutyl methacrylate, tert-butyl methacrylate; halogenated methacrylates, such as 2,2,2-trifluoroethyl methacrylate; 4-methyl cyclohexyl methacrylate, cyclohexyl methacrylate, furfuryl methacrylate, 1-phenylethyl methacrylate, 2-phenylethyl methacrylate, 1-phenylcyclohexyl methacrylate, benzyl methacrylate and phenyl methacrylate; acrylate monomers such as, methyl acrylate, ethyl acrylate, n-butyl acrylate, benzyl acrylate, 2-chloroethyl acrylate, methyl-α-chloro acrylate, 2,2,3,3-tetrafluoropropyl-α-fluoro acrylate, and 2,2,2-trifluoroethyl acrylate; acrylonitrile and α-methylacrylonitrile; vinyl monomers such as, vinyl acetate, vinyl benzoate, vinyl phenylacetate, vinyl chloroacetate; styrene monomers such as, styrene, halogenated styrenes, for example, o-chlorosytrene, p-fluorostyrene, o,p-difluorostyrene, and p-isopropyl styrene; perfluorinated monomers such as 2,2-bis(trifluoromethyl)-4,5-difluoro-1,3-dioxole also known as perfluoro(2,2-dimethyl-1,3-dioxole) (PDD), and any combination of monomers thereof. When a combination of monomers is employed polymerization will result in formation of a copolymer.

Figure 2:
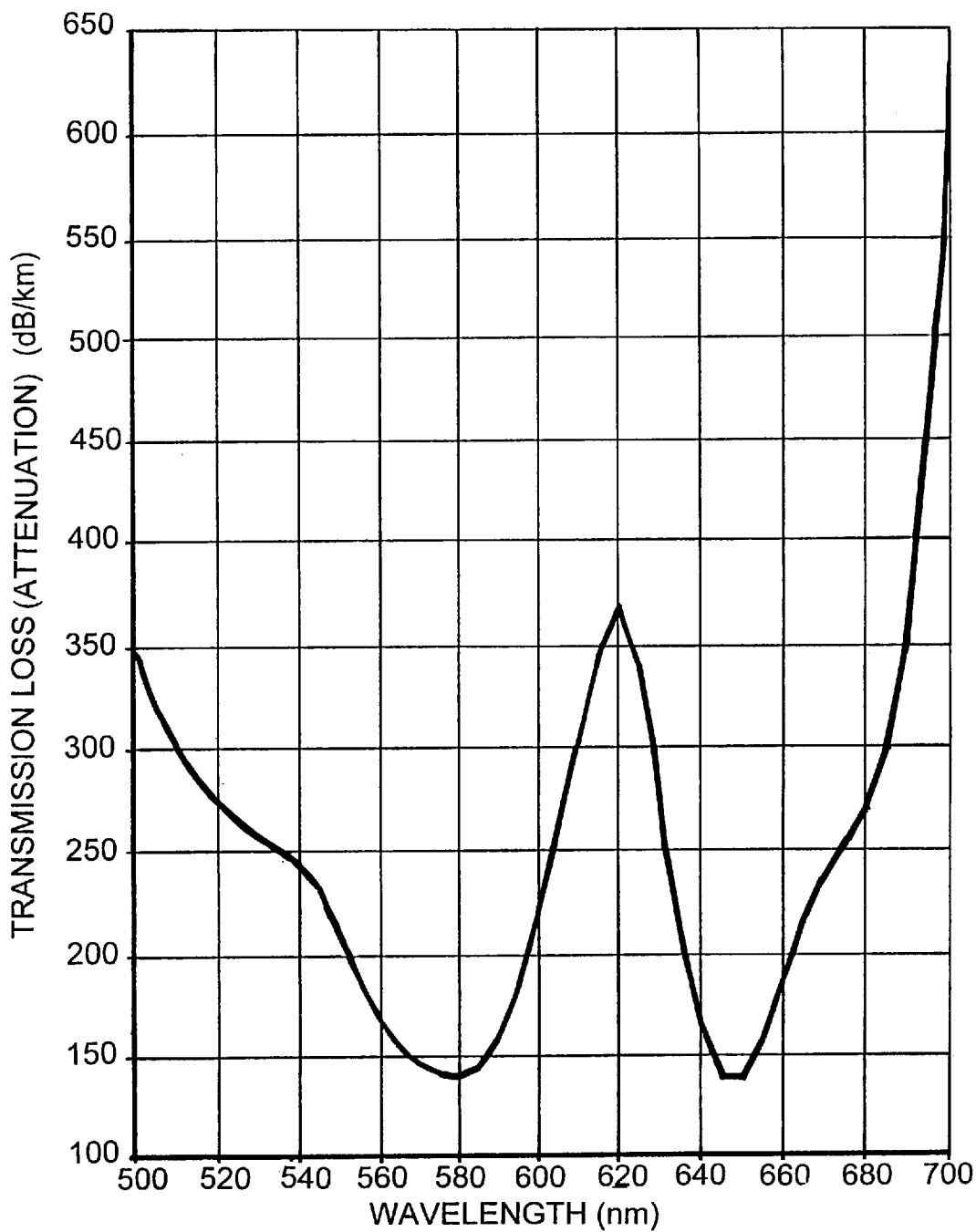
FIG. 2 is a graph showing the relationship between the transmission loss and wavelength of an optical fiber. The transmission loss was measured using standard techniques as described herein. Transmission loss at 650 nm was approximately 140 dB/km demonstrating that the optical fiber had a high level of transparency.

A sheathing dopant suitable for use in the methods of the invention is one which does not participate in the reaction which polymerizes the sheathing monomer. A suitable sheathing dopant will have a refractive index which is lower than that of the polymer obtained upon polymerization of the sheathing monomer of the sheathing solution. In addition, the sheathing dopant must not compromise the transparency of the polymer obtained upon polymerization of the sheathing monomer. The level of transparency is inversely related to the transmission loss of a graded index plastic optical conductor in the operating wavelength of the conductor, and can be assessed using techniques known to those of skill in the art. For example, a graded index plastic optical fiber which has a transmission loss value of 110 dB/km at an operating wavelength of 650 nm, possesses an adequate level of transparency as an optical conductor. However, a loss of more than 500 dB/km would not be an acceptable level of transparency. Therefore, a graded index optical material is transparent when an optical conductor, prepared from the material, has a transmission loss, also known as the attenuation, in the operating wavelength of the conductor less than 500 dB/km. FIG. 2 depicts the transmission loss of an optical fiber prepared using t#he method of the invention as described herein in Example 1. The loss was measured using methods known in the art such as those described in "Test Method for Attenuation of All Plastic Multimode Optical Fibers JIS C 6863-(1990)," *Japanese Industrial Standard* by the Japanese Standards Association. FIG. 2 shows a transmission loss of 140 dB/km at a wavelength of 650 nm. This transmission loss provides a fiber with a suitable level of transparency.

One useful criterion, for predicting whether or not the sheathing will be transparent, is predicated on the Flory-Huggins interaction parameter, $X_{AB}$. That is, $X_{AB}$ can be used as a guide to the likelihood of miscibility between substances A and B, which in this case would be sheathing polymer and sheathing dopant. The blend miscibility can be assumed to decrease with increasing values of $X_{AB}$. This parameter can be determined experimentally or approximated according to the following equation:

$$\chi_{AB} = \frac{V_{ref}(\delta_A - \delta_B)^2}{RT}$$

δ, is the solubility parameter which is a thermodynamic quantity generally defined as the square root of the cohesive energy density. The cohesive energy density is obtained by dividing the molar evaporation energy, ΔE, of a liquid by a molar volume, V. $V_{ref}$ is an appropriate reference volume. R is the gas constant and T is the temperature. A detailed discussion of the Flory-Huggins interaction parameter can be found in *CRC Handbook of Polymer-Liquid Interaction Parameters and Solubility Parameters*, by A. F. M. Barton, 1990.

However, the Flory-Huggins interaction parameter should be used as a guide to the selection of an appropriate dopant, but not as a limitation, since the concentration of the dopant is also an important criterion to consider in maintaining a sheathing and core with an acceptable transparency.

Some examples of sheathing dopants suitable for use in the invention include, but are not limited to, diisobutyl adipate, glycerol-triacetate, 2,2,4-trimethyl -1,3-pentanediol diisobutyrate, methyl laurate, dimethyl sebatate, isopropyl myristate, diethyl succinate, diethyl phthalate, tributyl phosphate, dicyclohexyl phthalate, dibutyl sebatate, diisooctyl phthalate, dicapryl phthalate, diisodecyl phthalate, butyl, octyl phthalate, dicapryl adipate, perfluorinated aromatics, for example perfluoro naphthalene, perfluorinated ethers and perfluorinated polyethers. Typically, the sheathing dopant is present in the sheathing at a concentration of between about 1 and about 35 weight percent of the monomer of the sheathing solution, more typically between about 1 and about 20 weight percent and most typically between about 1 and about 15 weight percent.

In general, the sheathing dopant can impart plasticizer-like qualities and/or hydrophobic properties upon the graded index plastic optical material. The presence of plasticizer-like qualities and/or hydrophobic properties in the graded index plastic optical material of the invention is advantageous. That is, plasticizer-like qualities allow the graded index plastic optical material to be hot-drawn at a lower temperature and a higher speed, which results in a fiber with an acceptable level of attenuation or transmission loss. Hydrophobic properties provide for an optical material with enhanced environmental stability, for example, decreased moisture absorbency.

Any method of polymerization can be used in the method of the invention for forming the graded index plastic optical material. These methods include, for example, free radical polymerization, atom transfer radical polymerization, anionic polymerization and cationic polymerization. Free radical bulk polymerization, employing either thermal or optical energy, is preferred.

When radical polymerization is employed, the sheathing solution also includes a radical polymerization initiator and a chain transfer agent. Suitable radical polymerization initiators are selected based on the type of energy employed in the polymerization reaction. For example, when heat or infrared polymerization is employed peroxides such as lauryl peroxide, benzoyl peroxide, t-butyl peroxide and 2,5- dimethyl-2,5-di(2-ethyl hexanoyl peroxy)hexane (TBEC) are suitable for use. When ultraviolet polymerization is employed benzoin methyl ether (BME) or benzoyl peroxide is suitable for use. Typically, the polymerization initiator is present in the sheathing solution in a range of between about 0.1 to about 0.5 percent by weight of the monomer.

Any chain transfer agent is suitable for use in the method of the invention. These include, but are not limited to, 1-butanethiol and 1-dodecanethiol. Typically, the chain transfer agent is present in the sheathing solution below about 0.5 percent by weight of the monomer.

As described earlier, the polymerization container is rotated during polymerization of the monomer of the sheathing solution. This rotation, for example, spinning, provides a transparent sheathing tube having an inner cylindrical configuration. The interior space of this sheathing tube thereby provides a suitable container for polymerization of the core monomer in a subsequent step of the claimed method.

The core of the graded index plastic optical material is the inner layer of the material which is disposed within the sheathing. The core is transparent and ultimately provides the component of the material through which light travels. The refractive index of the core is greater than that of the sheathing such the material is suitable to conduct light.

The core can be prepared by filling the sheathing tube with a core solution which comprises a core polymerizable monomer and an optional core dopant, and polymerizing the core monomer. The core polymerizable monomer can be any monomer which upon polymerization yields substantially amorphous and transparent polymeric materials capable of conducting light in the desired wavelength. In addition, the core polymerizable monomer, upon polymerization, has a refractive index greater than that of the sheathing such that the material is suitable to conduct light. All of the monomers which are suitable for use in preparing the sheathing are, likewise, suitable for use in preparing the core. A combination of monomers can also be used in preparation of the core thereby providing a core comprising a copolymer.

As described earlier, any method of polymerization is suitable for use in the method of the invention. When radical polymerization is employed in preparation of the core, a polymerization initiator is present in the core solution in ranges similar to those described earlier for the sheathing solution. Typically, the chain transfer agent is present below about 0.5 percent by weight of the monomer.

A core dopant suitable for use in the method of the invention is one which does not participate in the reaction which polymerizes the core monomer and which has a boiling point lower than the highest processing temperature to which it is subjected. A suitable core dopant will have a refractive index which is greater than that of the polymer obtained upon polymerization of the core monomer. In addition, the core dopant must not compromise the transparency of the polymer obtained upon polymerization of the core monomer. As in the preparation of the sheathing, one useful criterion for predicting whether or not the core will be transparent is predicated on the Flory-Huggins interaction parameter, between the core polymer and the core dopant. However, as discussed earlier this parameter should be used only as a guide not a limitation when choosing a suitable core dopant, since the concentration of the dopant also needs to be considered.

Compounds suitable for use as the core dopant in the method of the invention include, but are not limited to, dibenzyl ether, phenoxy toluene, 1,1-bis-(3,4-dimethyl phenyl) ethane, diphenyl ether, biphenyl, diphenyl sulfide, diphenylmethane, benzyl phthalate-n-butyl, 1-methoxyphenyl-1-phenylethane, benzyl benzoate, bromobenzene, o-dichlorobenzene, m-dichlorobenzene, 1,2-dibromomethane, 3-phenyl-1-propanol, dioctyl phthalate and perfluorinated aromatics, such as, perfluoro naphthalene.

When the core solution, which comprises the core monomer and an optional core dopant, is added to the sheathing tube, the inner surface of the sheathing tube, is slightly swollen by the core monomer. As a result, a gel phase is formed on the inner wall of the sheathing tube. The concentration of the polymer in the swollen phase layer is not uniform, in that the concentration of the polymer and sheathing dopant, eluted from the sheathing, gradually decreases with distance from the inner surface. Thus, a distributed concentration of the low refractive index dopant is formed in the gel phase due to diffusion of sheathing dopant. Polymerization starts from the vicinity of the inner surface of the sheathing and gradually grows to the center axis of the tube due to accelerated polymerization in the gel stated commonly known as the "gel-effect" (See for example, Koike, Y. et al., "High-Bandwidth Graded-Index Polymer Optical Fiber," *Journal of Lightwave Technology*, 13(7): 1475–1489 (1995) and Koike, Y. et al., "New Interfacial-Gel Copolymerization Technique for Steric GRIN Polymer Optical Waveguide and Lens Arrays," *Applied Optics*, 27(3): 486–491 (1988)).

When a core dopant is present, a concentration gradient of the core dopant, which remains in the core polymer, is also formed. As described in U.S. Pat. No. 5,541,247 by Koike, the core monomer polymerizes while the substance with a greater refractive index becomes highly concentrated at the center of the core. The high concentration of the core dopant which is present at the central part of the core gradually decreases in a radial direction toward the periphery, thereby, creating a gradient in a specific direction.

In a certain embodiment, the monomer of the sheathing solution and the monomer of the core solution are the same. Suitable monomers include those which form polymers that are substantially amorphous and transparent, thereby being capable of conducting light in the desired wavelength, as earlier described. When the sheathing and core monomers are the same, and a core dopant is present, the sheathing and core dopants will be different. That is, the sheathing dopant will have a refractive index which is less than that of the polymer obtained upon polymerization of the sheathing monomer while the core dopant will have a refractive index which is greater than that of the polymer obtained upon polymerization of the core monomer. However, the difference in refractive index between the sheathing dopant and core dopant should have a value which renders the optical material suitable to conduct light.

This difference in the refractive index could be, for example, 0.001 and be achieved by, for example, employing a core dopant with a refractive index greater than that of the core polymer by 0.0005 and a sheathing dopant with a refractive index less than of the sheathing polymer by 0.0005. Thus, the method of the invention has advantages over a method employing a dopant-free sheathing, in that a broader selection of materials which can employed as dopants is available, based on the additive effect of the core and sheathing dopant as opposed to the singular effect of the core dopant. Additionally, a lower concentration of dopant or no dopant at all can be used in the core and still achieve a comparable difference in refractive index.

In a specific embodiment, the monomer of the core and the sheathing is methyl methacrylate. In this embodiment, when a core dopant is present, the sheathing and core dopants are different substances. The difference in the refractive index between the dopants must be such that the optical material is suitable to conduct light. Additionally, the refractive index of the core dopant is greater than that of the sheathing dopant. For example, the dopant for the sheathing can be tributyl phosphate (refractive index=1.424) while the dopant for the core can be diphenyl sulfide (refractive index=1.6327).

In another embodiment, the monomer of the core and the sheathing is 2,2-bis(trifluoromethyl)-4,5-difluoro-1,3-dioxole also known as perfluoro(2,2-dimethyl-1,3-dioxole) (PDD). In this embodiment, when a core dopant is present, the sheathing and core dopants are different substances, with the difference in the refractive index between the dopants such that the optical material is suitable to conduct light. Additionally, the refractive index of the core dopant is greater than that of the sheathing dopant.

In yet another embodiment, the method of the invention further comprises the step of hot-drawing the graded index optical preform into a fiber. Typically, hot-drawing is conducted at a temperature suitable to sufficiently soften the preform rod to allow it to be drawn into a fiber. The drawing is generally conducted at a speed suitable to render the fiber useful as an optical conductor.

In yet another aspect, the invention provides a graded index plastic optical material comprising: (a) a transparent sheathing comprising a sheathing polymer and a sheathing dopant, wherein the sheathing dopant has a refractive index which is less than that of the sheathing polymer; and (b) a transparent core, disposed within the sheathing, comprising a core polymer having a refractive index greater than that of the sheathing and an optional core dopant, the core dopant, when present, having a refractive index which is greater than that of the core polymer; wherein the core dopant has a concentration gradient in a specific direction. The refractive index of the core is greater than the doped sheathing.

In a preferred embodiment, the graded index plastic optical material is in the shape of a cylindrical preform rod. In another application, the graded index plastic optical material is in the shape of a cylindrical fiber having an outer diameter between about 0.2 millimeters and about 1 millimeter. The fiber can be prepared, for example, by hot-drawing a preform rod, the fiber maintaining the same geometry of the preform but, with a smaller outer diameter.

In certain embodiments, the graded index plastic optical material has the same polymer in both the sheathing and the core. In this particular embodiment, when the optional core dopant is present, the core dopant and the sheathing dopant are different substances. The sheathing dopant has a refractive index which is less than that of the core dopant. The difference in refractive index between the dopants should be such that resulting optical material is suitable to conduct light. For example, the material should be useful as an optical conductor. For example, when the polymer of the core and sheathing is poly(methyl methacrylate), the sheathing dopant can be tributyl phosphate (refractive index= 1.424) and the core dopant can be diphenyl sulfide (refractive index=1.6327). When the polymer of the core and sheathing is, for example, that obtained upon polymerization of the monomer 2,2-bis(trifluoromethyl)-4,5-difluoro-1,3-dioxole, the sheathing dopant and core dopant are different substances, with the difference in the refractive index between the dopants such that the optical material is suitable to conduct light. In addition, the refractive index of the core dopant is higher than the sheathing dopant with both dopants being perhalogenated.

The advantages of the method of the invention include the availability of a significantly broader range of materials which are useful in preparing a graded index plastic optical material. This increase in the types of materials suitable for use in the invention provides, for example, the ability to increase the difference in the refractive index between the sheathing and the core without compromising the characteristics of the optical material and the ability to widen the operating wavelength of the material particularly when employed in data communications. In addition, the concentration of dopant in the core, necessary to provide the required difference in refractive index, can be decreased when a sheathing dopant, having a lower refractive index than the sheathing polymer, is present. This decrease in the concentration of the core dopant significantly improves the miscibility of materials which directly impacts the optical characteristics, for example, transparency of the optical material. Further, the sheathing dopant, in many instances, behaves as a plasticizer in the graded index plastic optical material. This plasticizer-like behavior allows for hot-drawing of the material, for example, in the shape of a preform rod at a lower temperature and/or higher speed.

The invention will now be further illustrated by the following examples which are not intended to limit the scope of the invention in any way. All percentages are by weight unless otherwise specified.

EXEMPLIFICATION

EXAMPLE 1

PREPARATION OF SHEATHING

A sheathing solution containing 1600 g of purified methyl methacrylate (MMA), 4.00 g (0.25 weight percent of MMA) of lauryl peroxide as the polymerization initiator, 3.42 ml of 1-butanethiol (0.18 weight percent of MMA) as the chain transfer reagent (available from Aldrich Chemical Co., Inc., Milwaukee, Wis.) and 128 g (8 weight percent of MMA) of dicyclohexyl phthalate was stirred and degassed for about 30 minutes.

To an appropriately stoppered glass tube, having an inner diameter of 30 mm and a length of 1.5 meters was added sheathing solution, to the appropriate height to achieve the desired final ratio of core to sheathing thickness. For example, a final ratio of the thickness of the sheathing wall to core thickness can be between about 1:4 to about 2:1. Both ends of the tube were sealed, and then the tube was placed in a water bath at a temperature of 71° C. and polymerized while being rotated at approximately 500 rpm for 20 hours. The tube was then placed in a rotating oven (approximately 5 rpms) for two hours at 100° C. A poly (methyl methacrylate) sheathing tube was prepared.

PREPARATION OF CORE

The sheathing prepared above was kept in the glass tube, and the container formed by the cylindrical inner surface of the sheathing was filled with a solution containing 350 g of MMA, 200 microliters of t-butyl peroxide, 600 microliters of 1-dodecanethiol and 30 grams (8.5 weight percent) of diphenyl sulfide. The tube was sealed and then heated in a vertical position at 90° C. for at least 12 hours. The tube was then placed in the oven horizontally and heated for 12 hours at 90° C., 24 hours at 110° C., 10 hours at 120° C. and 4 hours at 130° C. while rotating at a speed of 5 rpms.

The graded index plastic optical preform rod was then removed from the glass polymerization container. The rod was then slowly inserted into a cylindrical heating furnace from the top while the furnace was maintained at a temperature between 180° C. and 220° C. When the rod was softened sufficiently, spinning at a constant speed of approximately 5–15 meters/min was started from the bottom of the rod.

EXAMPLE 2

PREPARATION OF SHEATHING

A sheathing solution containing 1600 g of purified methyl methacrylate (MMA), 4.00 g (0.25 weight percent of MMA) of lauryl peroxide as the polymerization initiator, 3.42 ml of 1-butanethiol (0.18 weight percent of MMA) as the chain transfer reagent (available from Aldrich Chemical Co., Inc., Milwaukee, Wis.) and 320 g (20 weight percent of MMA) of dicyclohexyl phthalate was stirred and degassed for about 30 minutes.

To an appropriately stoppered glass tube, having an inner diameter of 30 mm and a length of 1.5 meters was added sheathing solution, to the appropriate height to achieve the desired final ratio of core to sheathing thickness. For example, a final ratio of sheathing to core thickness can be between about 1:4 to 2:1. Both ends of the tube were sealed, and then the tube was placed in a water bath at a temperature of 71° C. and polymerized while being rotated at approximately 500 rpm for 20 hours. The tube was then placed in a rotating oven (approximately 5 rpms) for two hours at 100° C. A poly(methyl methacrylate) sheathing tube was prepared.

PREPARATION OF CORE

The sheathing prepared above was kept in the glass tube, and the container formed by the inner surface of the sheathing was filled with a solution containing 350 g of MMA, 200 microliters of t-butyl peroxide and 600 microliters of 1-dodecanethiol. The tube was sealed and then heated in a vertical position at 90° C. for at least 12 hours. The tube was then placed in the oven horizontally and heated for 12 hours at 90° C., 24 hours at 110° C., 10 hours at 120° C. and 4 hours at 130° C. while rotating at a speed of 5 rpms.

The graded index plastic optical preform rod was then removed from the glass polymerization container. The rod was then slowly inserted into a cylindrical heating furnace from the top thereof while the furnace was maintained at a temperature between 180° C. and 220° C. When the rod was softened sufficiently, spinning at a constant speed of approximately 5–15 meters/min was started from the bottom of the rod.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A graded index plastic optical material comprising:
   (a) a transparent sheathing having a sheathing polymer and a sheathing dopant, the sheathing dopant having a refractive index which is less than that of the sheathing polymer; and
   (b) a transparent core within the sheathing formed by polymerization of a core solution comprising a core polymerizable monomer within the sheathing, comprising a core polymer having a refractive index greater than that of the sheathing and an optional core dopant having a refractive index which is greater than that of the core polymer; wherein the core dopant has a concentration within the core that is established by redistribution of the core dopant during polymerization of the core solution comprising a core polymerization monomer.

2. The material of claim 1 wherein the refractive index of the transparent core is greater than that of the transparent sheathing such that the material is suitable to conduct light.

3. The material of claim 1 in the shape of a cylindrical preform rod.

4. The material of claim 1 in the shape of a cylindrical fiber having an outer diameter between about 0.2 millimeters and about 1 millimeter.

5. The material of claim 1 wherein the sheathing and core polymers are formed from different polymerizable monomers.

6. The material of claim 1 wherein the sheathing and core polymers are formed from the same polymerizable monomer.

7. The material of claim 6 wherein the polymerizable monomer is methyl methacrylate.

8. The material of claim 7 wherein the sheathing dopant is dimethyl sebatate.

9. The material of claim 8 wherein the core dopant is benzyl benzoate.

10. The material of claim 7 wherein the sheathing dopant is diisobutyl adipate.

11. The material of claim 10 wherein the core dopant is benzyl benzoate.

12. The material of claim 6 wherein the polymerizable monomer is 2,2-bis(trifluoromethyl)-4,5-difluoro-1,3-dioxole.

13. The material of claim 1 wherein the core dopant is not present.

14. A graded index plastic optical fiber which is optionally jacketed with a suitable jacketing composition in either a single or duplex configuration produced by the method comprising the steps of:
   (a) providing a transparent tube of material comprising a sheathing polymer and a sheathing dopant wherein the sheathing tube is made by (I) placing into a polymerization container a sheathing solution comprising a sheathing polymerizable monomer and a sheathing dopant, the sheathing dopant having a refractive index lower than that of the polymer obtained by the polymerization of the sheathing monomer, and (ii) causing the sheathing monomer of the sheathing solution to polymerize within the polymerization container in a cylindrical configuration to form a transparent sheathing tube;
   (b) forming a transparent core, within the sheathing tube produced in step (a), said core having a refractive index greater than that of the sheathing tube by (I) filling the sheathing tube with a core solution comprising a core polymerizable monomer, which upon polymerization, has a refractive index greater than that of the sheathing tube and with an optional core dopant having a refractive index greater than that of the polymer obtained upon polymerization of the core monomer, and (ii) polymerizing the core monomer of the core solution to form a graded index plastic optical material having an outer sheathing and an inner core;
   (c) hot-drawing the graded index plastic optical material at a temperature and speed, to thereby obtain a graded index plastic optical fiber.

\* \* \* \* \*